(12) United States Patent
Yan et al.

(10) Patent No.: US 8,080,995 B2
(45) Date of Patent: Dec. 20, 2011

(54) DEVICE HOUSING

(75) Inventors: Yong Yan, Shenzhen (CN); Zhan Li, Santa Clara, CA (US); Yong-Fa Fan, Shenzhen (CN); Zhi-Guo Zhao, Shenzhen (CN); Yin Meng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 75 days.

(21) Appl. No.: 12/795,815

(22) Filed: Jun. 8, 2010

(65) Prior Publication Data

US 2011/0057858 A1   Mar. 10, 2011

(30) Foreign Application Priority Data

Sep. 10, 2009   (CN) .......................... 2009 1 0306863

(51) Int. Cl.
    *G01V 3/00*      (2006.01)
(52) U.S. Cl. ...................................................... 324/300

(58) Field of Classification Search .......... 324/300–322; 600/407–445; 343/702; 342/372, 374; 359/130, 359/566, 569, 570; 428/336
See application file for complete search history.

(56) References Cited

U.S. PATENT DOCUMENTS

| | | | | |
|---|---|---|---|---|
| 6,951,715 | B2* | 10/2005 | Cunningham et al. | 435/4 |
| 7,619,562 | B2* | 11/2009 | Stumbo et al. | 342/372 |
| 7,923,239 | B2* | 4/2011 | Cunningham et al. | 435/287.1 |
| 2011/0050511 | A1* | 3/2011 | Wang | 343/702 |
| 2011/0074639 | A1* | 3/2011 | Zhao et al. | 343/702 |

* cited by examiner

*Primary Examiner* — Brij Shrivastav
(74) *Attorney, Agent, or Firm* — Altis Law Group, Inc.

(57) ABSTRACT

A device housing comprises a main body and a three-dimensional antenna. The main body comprises a first molded body and a second molded body formed on the first molding body. The first molded body is made of plastic, the second molded body is made of plastic mixed with laser activatable additives. The second molded body has a predefined activating region formed by laser activation. The three-dimensional antenna is an electroplated coating and is formed on the predefined activating region of the second molding body.

14 Claims, 2 Drawing Sheets

DEVICE HOUSING

BACKGROUND

1. Technical Field

The present disclosure relates to device housings, especially to a device housing having a three-dimensional antenna formed thereon.

2. Description of Related Art

Antennas are critical for wireless communication of electronic devices (such as mobile phones, computers, PDAs, and so on). Laser Direct Structuring (LDS) is a method recently used to manufacture antennas. Manufacturing antennas by LDS commonly includes three steps: forming a plastic substrate using modified plastics which can be laser activatable to be conductive; focusing a laser on a predefined region of the surface of the plastic substrate to make the metal crystals contained in the modified plastics spread to cover the predefined region; and depositing a conductive metal coating on the predefined region to form the antenna. The LDS antenna can be designed with many suitable three-dimensional shapes according to frequencies to be used, and can be easily produced. However, the modified plastics used for the LDS antennas are very costly.

Therefore, there is room for improvement within the art.

BRIEF DESCRIPTION OF THE FIGURES

Many aspects of the device housing can be better understood with reference to the following figures. The components in the figures are not necessarily drawn to scale, the emphasis instead being placed upon clearly illustrating the principles of the device housing. Moreover, in the drawings like reference numerals designate corresponding parts throughout the several views.

DETAILED DESCRIPTION

Figure 1:
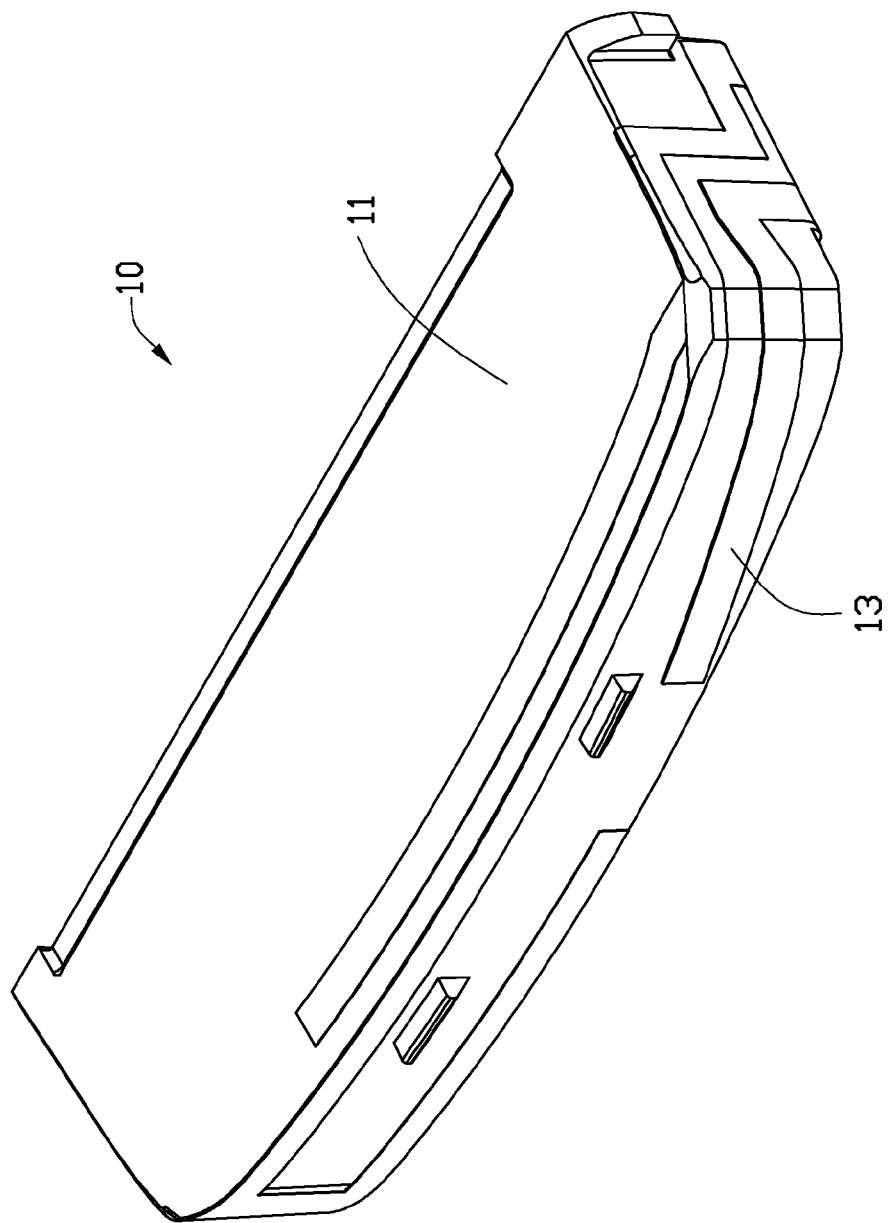
FIG. 1 is a schematic view of an exemplary embodiment of a device housing.

FIG. 1 shows a device housing 10 including a main body 11 and a three-dimensional antenna 13 formed on the main body 11. By three-dimensional, it is meant that the antenna is not confined to one plane in shape.

Figure 2:
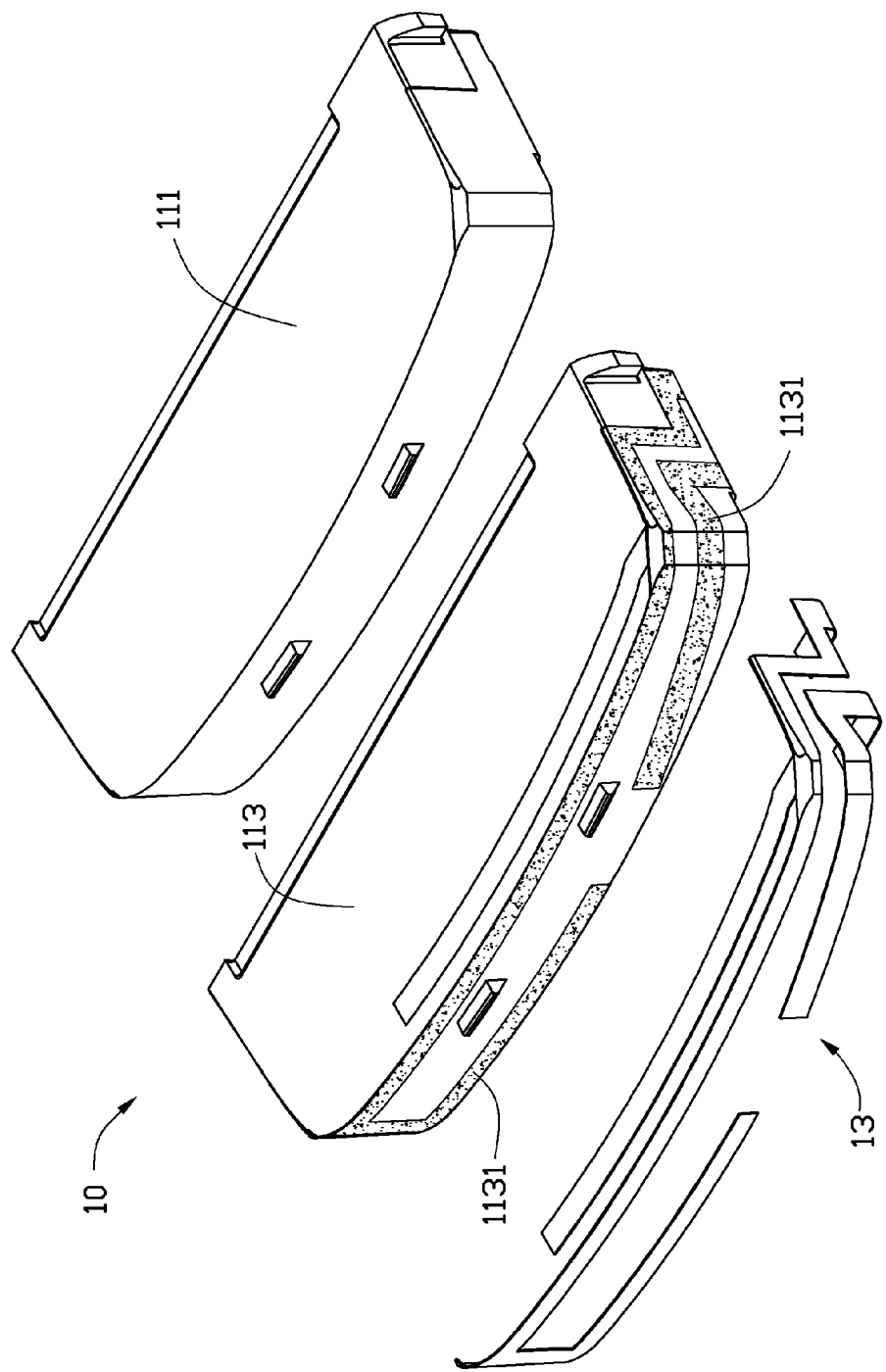
FIG. 2 is an exploded view of an exemplary embodiment of the device housing shown in FIG. 1.

Referring to FIG. 2, the main body 11 includes a first molded body 111 and a second molded body 113 formed on the first molded body 111. The first molded body 111 and the second molded body 113 are formed by a two-shot injection molding process.

The first molded body 111 may be molded using plastics. The plastics may be one or more materials selected from a group consisting of polypropylene (PP), polyamide (PA), polycarbonate (PC), polyethylene terephthalate (PET), and polymethyl methacrylate (PMMA). The first molded body 111 may be molded with the structure of the device housing 10 and may have a thickness of about two-thirds to four-fifths of the final thickness of the device housing 10.

The second molded body 113 may be molded using modified plastics. The modified plastics may be thermal plastics mixed with organic fillers and laser activatable additives. The thermal plastics may be polyethylene terephthalate (PET) or polyimide (PI) and may have a percentage of 65-75% by weight in the second molded body 113. The organic fillers may be hydrated silica and/or hydrated silica derivatives and may have a percentage of 22-28% by weight in the second molded body 113. The laser activatable additives may be spinel-based non-conductive high oxides which contain metal crystal nuclei. The non-conductive high oxides can be a spinel containing copper. The spinel-based non-conductive high oxide may have a percentage of 3-7% by weight in the second molded body 113.

The second molded body 113 can be laser activatable because of the included laser activatable additives. The second molded body 113 predefines an activating region 1131 thereon. When the activating region 1131 is laser irradiated, the metal crystals contained in the laser activatable additives spread to cover the activating region 1131, thus making the surface of the activating region 1131 electrically conductive so that an electroplating process or other metallic coating depositing process can be applied to the activating region 1131 to form an antenna.

The three-dimensional antenna 13 may be an electroplated coating formed on and bonded with the metal crystals of the activating region 1131 by electroplating after the activating region 1131 has been laser activated. The electroplated coating may comprise a copper coating, a nickel coating, and an gold coating formed on the activating region 1131 in that order. The copper coating may act as the antenna to receive and transmit wireless signals. The nickel coating can enhance the bonding between the copper coating and the gold coating. The gold coating has a high oxidation resistance and accordingly can prevent the three-dimensional antenna 13 being oxidized. Furthermore, the gold coating has a high electrical conductive property and can ensure the electric connection between the three-dimensional antenna 13 and the control system of electronic devices.

The exemplary device housing 10 includes a first molded body 111 formed with common plastics and a second molded body 113 formed with modified plastics that can be laser activatable, which greatly reduces the quantity of costly modified plastics needed and saves money compared to the device housings using only modified plastics. Additionally, the exemplary three-dimensional antenna 13 can be designed with many suitable shapes according to frequencies to be used, and can be easily produced.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A device housing, comprising:
  a main body comprising a first molded body and a second molded body formed on the first molding body; the first molded body being made of plastic, the second molded body being made of plastic mixed with laser activatable additives, the second molded body having a predefined activating region formed by laser activation; and
  a three-dimensional antenna, the three-dimensional antenna being an electroplated coating and being formed on the predefined activating region of the second molding body.

2. The device housing as claimed in claim 1, wherein the first molded body is molded using one or more plastics selected from a group consisting of polypropylene, polyamide, polycarbonate, polyethylene terephthalate, and polymethyl methacrylate.

3. The device housing as claimed in claim 1, wherein the second molded body is molded with thermal plastics mixed with organic fillers and laser activatable additives.

4. The device housing as claimed in claim 3, wherein the thermal plastics is polyethylene terephthalate or polyimide.

5. The device housing as claimed in claim 4, wherein the thermal plastics have a percentage of 65-75% by weight in the second molding body.

6. The device housing as claimed in claim 3, wherein the organic fillers are hydrated silica and hydrated silica derivate.

7. The device housing as claimed in claim 3, wherein the organic filler is hydrated silica or hydrated silica derivate.

8. The device housing as claimed in claim 3, wherein the organic fillers have a percentage of 22-28% by weight in the second molding body.

9. The device housing as claimed in claim 3, wherein the laser activatable additives are spinel-based non-conductive high oxides.

10. The device housing as claimed in claim 9, wherein the spinel-based non-conductive high oxides have a percentage of 3-7% by weight in the second molding body.

11. The device housing as claimed in claim 9, wherein the spinel-based non-conductive high oxide is a spinel containing copper.

12. The device housing as claimed in claim 1, wherein the three-dimensional antenna comprises a copper coating, a nickel coating, and an gold coating formed on the activating region of the second molded body in order.

13. The device housing as claimed in claim 1, wherein the first molded body and the second molded body are formed by a two-shot injection molding process.

14. A device housing, comprising:
   a main body comprising a first molded body made of plastic and a second molded body made of plastic mixed with laser activatable additives formed on the first molding body, the second molded body having a predefined activating region formed by laser activation, the activating region being covered with metal crystal nucleus; and
   a three-dimensional antenna being formed on the predefined activating region, the three-dimensional antenna being an electroplated coating and bonding with the metal crystal nucleus.

\* \* \* \* \*